United States Patent
Hoekstra

(10) Patent No.: US 8,129,909 B1
(45) Date of Patent: Mar. 6, 2012

(54) PROTECTED TRAILER LIGHTING CONVERTER

(76) Inventor: Eric J. Hoekstra, Holland, MI (US)

( * ) Notice: Subject to any disclaimer, the term of this patent is extended or adjusted under 35 U.S.C. 154(b) by 396 days.

(21) Appl. No.: 12/369,207

(22) Filed: Feb. 11, 2009

Related U.S. Application Data

(60) Provisional application No. 61/029,029, filed on Feb. 15, 2008.

(51) Int. Cl.
*B60Q 1/02* (2006.01)
*B60Q 1/14* (2006.01)

(52) U.S. Cl. .......... 315/82; 315/77; 307/10.8; 307/10.1; 340/431; 340/468

(58) Field of Classification Search .............. 315/77–84; 340/431, 468; 307/10.8
See application file for complete search history.

(56) References Cited

U.S. PATENT DOCUMENTS

| | | | |
|---|---|---|---|
| 4,006,453 A | 2/1977 | Bryant | |
| 5,030,938 A | 7/1991 | Bondzeit | |
| 5,241,241 A | 8/1993 | Eccleston | |
| 5,498,910 A | 3/1996 | Hopkins et al. | |
| 5,701,116 A | 12/1997 | Hoekstra | |
| 6,130,487 A * | 10/2000 | Bertalan et al. | 307/9.1 |
| 6,177,865 B1 | 1/2001 | Bryant et al. | |
| 6,232,722 B1 | 5/2001 | Bryant et al. | |
| 6,545,600 B1 * | 4/2003 | Boner | 340/468 |
| 2002/0125771 A1 * | 9/2002 | Kaminski | 307/10.1 |

OTHER PUBLICATIONS

Commonly owned co-pending U.S. Appl. No. 12/574,812, filed Oct. 7, 2009, entitled Adapter for Trailer Lighting Control From Modulated Input Signals (Our File: HOE01 P-101A).

* cited by examiner

*Primary Examiner* — Shawki S Ismail
*Assistant Examiner* — Jany Tran
(74) *Attorney, Agent, or Firm* — Gardner, Linn, Burkhart & Flory, LLP

(57) ABSTRACT

A trailer light converter that is configured to operate lights of a towed vehicle from signals supplied from lighting circuits of a towing vehicle includes at least one input that is adapted to be connected with the lighting circuits of a towing vehicle and at least one output that is adapted to be connected with the lights of a towed vehicle. At least one switch is provided that is responsive to a signal applied to the at least one input to supply electrical power to the at least one output to illuminate at least one light of the towed vehicle. The at least one switch includes a switching transistor and an overload protector. The at least one switch is responsive to the signal applied to the at least one input to change to a low impedance state to supply power to the at least one output. The overload protector is responsive to an overload condition on the at least one output to turn the at least one switch to a high impedance state to remove power from the least one output.

20 Claims, 2 Drawing Sheets

PROTECTED TRAILER LIGHTING CONVERTER

CROSS REFERENCE TO RELATED APPLICATION

This application claims priority from U.S. provisional patent application Ser. No. 61/029,029, filed on Feb. 15, 2008, the disclosure of which is hereby incorporated herein by reference in its entirety.

BACKGROUND OF THE INVENTION

The present invention relates to electronic converter circuits which are used to sense indicator signals generated by a towing vehicle and in response drive the lighting circuits of a towed trailer.

Devices for the interface of trailer lights to a towing vehicle are well known. Since towing vehicles started separating the turn signal lamps from the brake signal function a need has existed to perform a logical conversion to interface the combined brake/turn signals commonly used on trailers to such towing vehicles. U.S. Pat. Nos. 3,970,860, 5,241,241, and 3,849,644 illustrate lighting converter circuits suitable for switching the appropriate signal circuit to the trailer lamps.

Similarly, converters with buffering have been produced before as well; U.S. Pat. Nos. 5,701,116, 6,232,722, and 5,030,938 illustrate techniques by which the interface function might be accomplished without drawing the trailer light power from the towing vehicle lighting circuits.

SUMMARY OF THE INVENTION

One disadvantage found in prior systems is that the output circuitry is not protected from load faults such as would occur with a short circuited wiring harness in the trailer. If the power supply fuse did not blow to interrupt power to the lighting converter the output devices of the converter would be damaged. Also, the need to replace blown fuses is an annoyance even if they function properly.

A trailer light converter that is adapted to operate lights of a towed vehicle from signals supplied from lighting circuits of a towing vehicle, according to an aspect of the invention, includes at least one input that is adapted to be connected with the lighting circuits of a towing vehicle and at least one output that is adapted to be connected with the lights of a towed vehicle. At least one switch circuit is provided that is responsive to a signal applied to the at least one input to supply electrical power to the at least one output to illuminate at least one light of the towed vehicle. The at least one switch includes a switching transistor and an overload protector. The at least one switch responds to the signal applied to the at least one input to change to a low impedance state to supply power to the at least one output. The overload protector is responsive to an overload condition on the at least one output to turn the at least one switch to a high impedance state to remove power from the least one output.

The overload protector may be responsive to an increase in voltage across the at least one switch to turn the at least one switch to a high impedance state. The at least one switch may be a field effect transistor and the overload protector may be responsive to an increase in voltage across the source to drain junction of the field effect transistor. The trailer light converter may include a timing section that delays the overload protector from responding to a transient overload condition thereby avoiding nuisance responses.

The at least one switch may draw power from the battery circuit or ignition circuit of the towing vehicle or may draw power from the lighting circuits of the towing vehicle. The at least one input may include a plurality of inputs and the at least one output may include a plurality of outputs. The plurality of inputs include a right signal input, a left signal input, a stop light input and a running light input. The outputs include a right lamp output, a left lamp output and a running lamp output. The at least one switch may include a plurality of switches. One of the switches may be responsive to operation of the right signal input or the stop light input to illuminate the right light of the towed vehicle. Another of said switches may be responsive to operation of the left signal input or said stop light input to illuminate the left light of the towed vehicle. Yet another of the switches may be responsive to operation of the running light input to illuminate the running light of the towed vehicle.

The at least one switch may be configured to operate with the overload protector or without the overload protector. Similarly, over-temperature protection may or may not be included as required by the application. In this manner, a scaled down version of the trailer lighting converter may be provided with reduced part count.

These and other objects, advantages and features of this invention will become apparent upon review of the following specification in conjunction with the drawings.

DESCRIPTION OF THE PREFERRED EMBODIMENT

Figure 1:
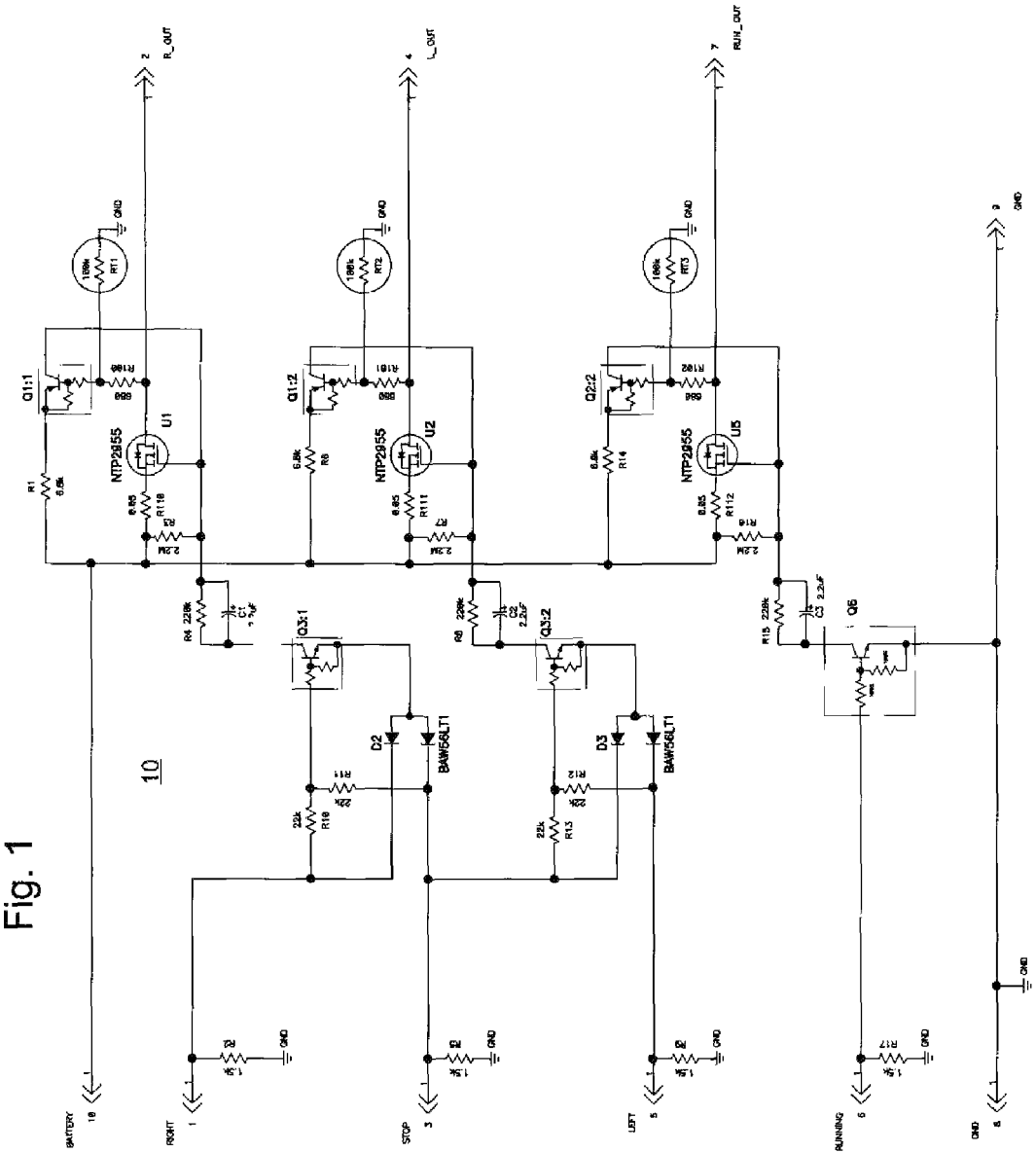
FIG. 1 is a schematic diagram showing a preferred embodiment of the protected trailer light converter that is operational from a vehicle battery circuit or ignition circuit of the towing vehicle.

Referring now specifically to the drawings, and the illustrative embodiments depicted therein, a trailer light converter, or lighting circuit 10, according to the various embodiments disclosed herein, include inputs adapted to be connected with the RIGHT, LEFT and STOP signals connecting to the towing vehicle (FIG. 1). The RIGHT and LEFT signals are at a high potential, nominally 12V, when the appropriate signal lamp is illuminated. The STOP signal is at a high potential when the vehicles braking system is actuated. The RUNNING signal connection is at a high potential, nominally 12V, when the vehicle's marker, taillights, and clearance lights are illuminated. Finally, the BATTERY input is connected to the towing vehicle's battery circuit or ignition circuit to provide power to the towed vehicle lights.

The following modes of operation will be described with the trailer light converter module:
OFF
Running Lights On
Turn-on into overload
Clearing of fault condition.
Right Turn
Left Turn (same as right)
Stoplight
Right Turn and Stoplight
Left Turn and Stoplight
Hazard flasher modes.

The following text discusses converter function in each of these modes. As the output stage operation and protection mechanism is common to all channels (RIGHT, LEFT, and RUNNING) it will be discussed using the RUNNING light circuit first.

OFF Condition:

In the OFF condition the signal levels on the RIGHT, STOP, LEFT, and RUNNING inputs are all at a low potential. In this condition, input transistors Q3:1, Q3:2, and Q6 are all biased "OFF", allowing R3, R7, and R16 to turn the output switching transistors U1, U2, and U3 "OFF" as well. No output current is sourced to the output terminals and the towed vehicle lights remain "OFF" as well.

RUNNING Lights ON:

When the towing vehicle running lights are turned "ON" the RUNNING signal input changes to a high potential, nominally 12V. This turns input transistor Q6 "ON" and turns output transistor U5 "ON" by pulling its gate towards GROUND though R15 and C3. As output transistor U5 turns ON the voltage drop between the drain and source terminals of this field effect transistor (FET) approaches zero volts, allowing Q2:2 to turn OFF. As output transistor U5 is now ON, it allows current to flow from the BATTERY terminal to the RUN_OUT terminal which then energizes the running lamps on the towed vehicle.

RUNNING Lights with Faulted Load:

If the RUN_OUT circuit (connected to the towed vehicle running lights) were faulted, such as with a short circuit to ground, the circuit will protect itself as follows:

If the fault occurs while the RUNNING light channel is actuated Input transistor Q6 is ON and output transistor U5 is ON. At the moment of the overload the MOSFET U5 will attempt to pass an excessively high amount of current to the faulted load. This will result in a high voltage drop between the Drain and Source leads of U5 added to the voltage drop over resistor R112, which will turn overload protector Q2:2 ON. When Q2:2 is turned ON a timing circuit made up of a capacitor C3 will charge through a resistor R14, turning output transistor U5 OFF after a time determined by resistor R14 and capacitor C3. In this way a time delay is accomplished to prevent nuisance over-current trips and yet protect the circuitry in the case of a faulted load condition.

If the RUNNING light channel is activated into a shorted channel a similar turn-off mechanism will occur: When the RUNNING light input is activated Q6 will turn ON, turning U5 ON through the action of R15 and C3. Since the load is faulted, the voltage drop over transistor U5 and resistor R112 will be excessive and Q2:2 will be ON, causing C3 to charge through R14 and after a time delay set by R14 and C3 will turn U5 OFF. In this way a time delay is accomplished to allow for the inrush over-current of typical incandescent lamps and yet protect the circuitry in the case of a faulted load condition. Note that the voltage drop over U5 is now Vbat; Q2:2 will remain ON, latching the circuit OFF.

Once the over-current protection is engaged, the channel must be turned OFF for a time sufficient for resistor R15 to discharge C3, then back ON again to reactivate the load. A temperature sensitive resistor RT3 provides a pre-bias to the protector mechanism. If the temperature of the assembly is excessive, the over-current shutdown will occur at a lower current.

RIGHT Turn Indication:

Right Turn indication is performed by the towing vehicle by pulsing the RIGHT input ON, then OFF at a nominally 1 Hz rate. During the ON portion of the cycle the RIGHT input to the module is at a high potential (nominally 12V) while the LEFT and STOP inputs are nominally low. This applies a forward bias to Q3:1 which turns on, turning U1 ON in similar manner as previously described for the RUNNING light section. Note that a faulted load will result in the channel turning off by the same mechanism as described in the RUNNING light circuit description as well. During the OFF portion of the blinker cycle the RIGHT input is low, Q3:1 and U1 are turned OFF, and the R_OUT terminal is a low potential (same as the OFF condition described above).

LEFT Turn Indication:

LEFT turn indication is essentially the same as right turn indication with Q3:2, Q1:2, D3 and U2 corresponding to Q3:1, Q1:1, D2 and U1 of the right channel.

STOP Light Indication:

STOP light indication is performed by the towing vehicle by applying a high potential to the STOP input with the RIGHT and LEFT inputs held low. This applies a forward bias to Q3:1 and Q3:2 which in turn biases U1 and U2 ON to switch power to both the RIGHT and LEFT trailer lamps simultaneously.

STOP Light and RIGHT Turn Indication:

When a RIGHT turn is being indicated simultaneously to a STOP light indication it is desired that the LEFT trailer lamp be turned on steadily while the RIGHT trailer lamp flashes ON/OFF in response to the towing vehicle signal light. This is accomplished by the action of diodes D2a and D2b. During the portion of the blink cycle when the module RIGHT input is high it can be seen that both the STOP input and the RIGHT input are at a high level. In this condition the diodes D2a and D2b are both reverse biased and no current can flow through Q3:1, causing U1 to be turned OFF and the RIGHT output to be low. During the portion of the blink cycle when the RIGHT input is low (the STOP input is high) Q3:1 is biased ON through R10. Current flows through Q3:1 through D2:a and R2 to ground (or the towing vehicle lamps through the RIGHT input) to turn U1 ON and operate the trailer's RIGHT side lamp(s).

STOP and LEFT Turn Indication:

This mode of operation can be seen to be essentially the same as STOP and RIGHT turn indication with Q3:2, Q1:2, D3 and U2 corresponding to Q3:1, Q1:1, D2 and U1 of the right channel.

HAZARD Flasher Operation:

In HAZARD flasher operation the RIGHT and LEFT signals both flash on/off together. Operation of the controller module can be seen to be the same as simultaneous operation in both RIGHT turn and LEFT turn indication modes, both with and without STOP light indication as described above.

Figure 2:
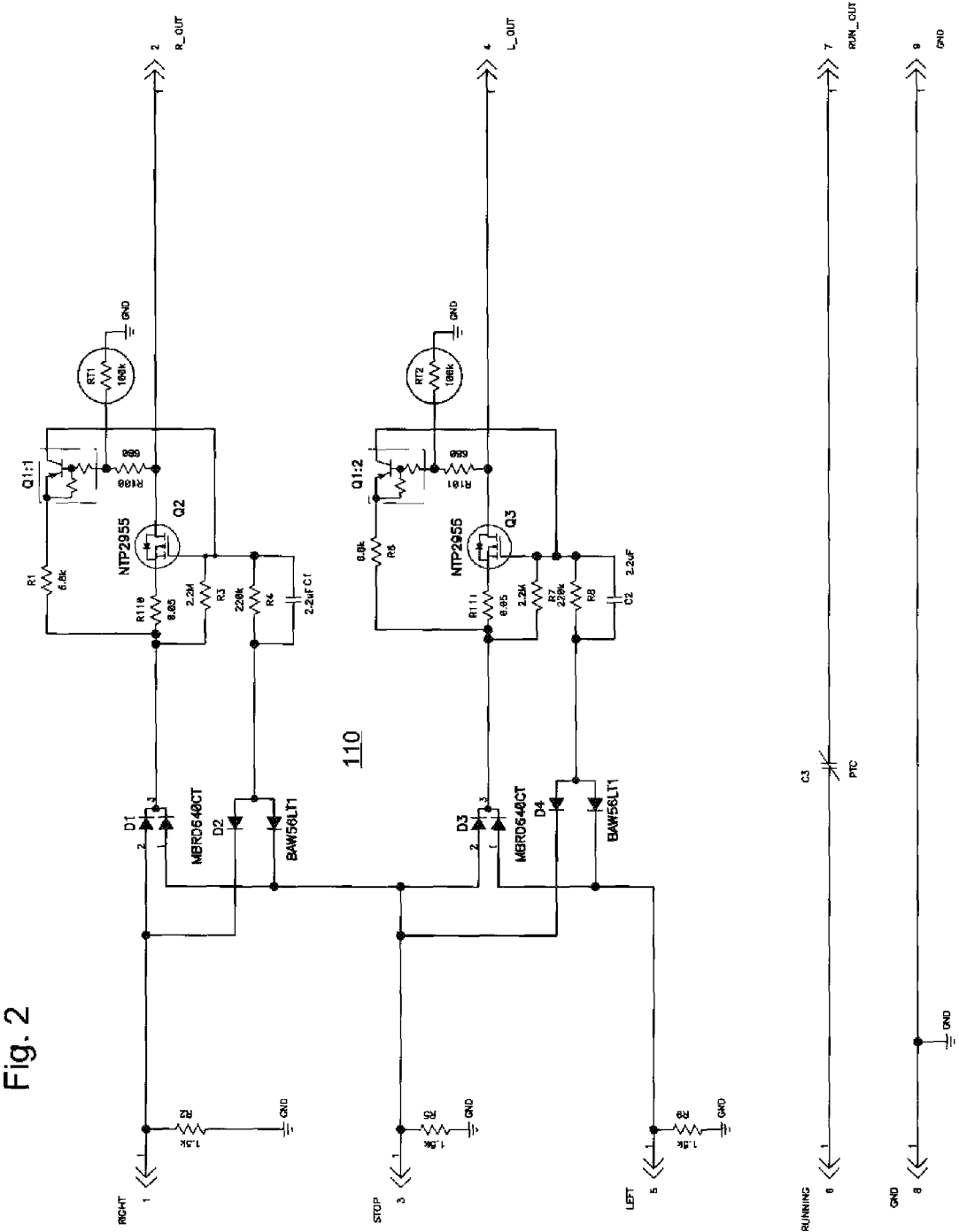
FIG. 2 is a schematic diagram showing another preferred embodiment of the protected trailer light converter that is operational from the lighting circuits of the towing vehicle.

Operation of the Non-Battery Powered Version:

Operation of a non-battery powered trailer light converter 110 includes all operating modes described above but power is derived from the vehicle lighting circuits instead of from a battery connection as used above (FIG. 2).

OFF State:

In the OFF state all inputs are at a low potential; no power is passed to any of the trailer lights.

Running Lights on:

The trailer running lights are connected to the vehicle running lights through a positive temperature coefficient (PTC) circuit protection device. When the vehicle running lights are turned on the trailer running lights will be powered through the device. If a fault occurs, which draws excessive current through the PTC device, it will switch to a high impedance state, effectively disconnecting the load.

Right Turn:

During the ON portion of the blink cycle power from the RIGHT input will be passed through diode D1 to the MOSFET Q2. Since the STOP signal is at a low potential the gate terminal of Q2 will be pulled low through D2 and Q2 will be turned ON allowing current to flow from the RIGHT input to the RIGHT output to the trailer lights. During the OFF portion of the cycle there is no power to the circuit and the trailer lamps are OFF.

Right Turn into Shorted Load:

If the trailer load is faulted such as with a short circuit Q2 will attempt to power the load normally. When the current through Q2 reaches an excessive value the voltage drop over Q2 and R110 will reach a value such that Q1:1 is turned on. The resulting current through Q1:1 will charge C1 in a time determined by C1 and R1; this will turn Q2 OFF and will protect the module and vehicle circuitry. This delay is selected to allow the turn-on time of incandescent lamps with their characteristic inrush current.

Temperature sensitive resistor RT1 provides a pre-bias to the protector mechanism. If the temperature of the assembly is excessive, the over-current shutdown will occur at a lower current.

STOPLIGHT Indication:

When the RIGHT turn signal is off and the STOP light input is high power from the RIGHT input will be passed through diode D1 to the MOSFET Q2. Since the RIGHT input is at a low potential the gate terminal of Q2 will be pulled low through D2 and Q2 will be turned ON allowing current to flow from the STOP input to the RIGHT output to the trailer lights.

Right Turn and STOP Indication:

During the ON portion of the blink cycle both the RIGHT input and the STOP input will be high. Since both sections of D2 are high the gate terminal of Q2 will remain high and Q2 will be OFF. During the OFF portion of the blink cycle D2 will conduct, pulling the gate of Q2 low and allowing it to turn-on. This allows current to flow from the STOP input to the R_OUT terminal and lights the RIGHT trailer lamp.

LEFT Channel Operation:

Operation of the LEFT channel can be seen to be the same as the RIGHT channel with corresponding components and signals.

The described embodiments provide a cost-effective approach to a buffered lighting converter. The device will perform the required interface and logical conversion necessary to connect the combined brake and turn signals commonly used by trailers to vehicles with separate STOPLIGHT and TURN signals. In addition, the circuit as built above will provide a protected output stage which drives the output lamps (trailer lights) in response to the towed vehicle lights. Power to the trailer lights may be drawn from a dedicated battery wire or ignition wire; whereby only a signal current of approximately 10 milliamperes is drawn from the towing vehicle lighting circuits to operate the converter logic.

The various trailer light converter embodiments disclosed herein provide build options for construction of non-protected units for more cost-sensitive applications. By deleting the overload protection components, a converter may be provided with the same nominal function, but without the overload protection.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A trailer light converter that is configured to operate lights of a towed vehicle from signals supplied from lighting circuits of a towing vehicle, said converter comprising:
at least one input that is connectable with lighting circuits of a towing vehicle and at least one output that is connectable with lights of a towed vehicle;
at least one switch that is responsive to a signal applied to said at least one input to supply electrical power to said at least one output to illuminate at least one light of the towed vehicle;
wherein said at least one switch comprises a switching transistor and an overload protector, said at least one switch being responsive to the signal applied to said at least one input to change to a low-impedance state to supply power to said at least one output and said overload protector is responsive to an overload condition on said at least one output to turn said at least one switch to a high impedance state to remove power from said at least one output, wherein said overload protector is electrically connected in parallel with said switching transistor and is responsive to an increase in voltage across said switching transistor to turn said at least one switch to the high-impedance state.

2. The trailer light converter as claimed in claim 1 wherein said switching transistor comprises a field effect transistor and said overload protector is responsive to an increase in voltage across the source to drain junction of said field effect transistor.

3. The trailer light converter as claimed in claim 1 including a timing section, said timing section delaying said overload protector responding to an overload condition thereby avoiding nuisance responses.

4. The trailer light converter as claimed in claim 1 wherein said at least one switch draws power from a battery circuit or from an ignition circuit of the towing vehicle.

5. The trailer light converter as claimed in claim 1 wherein said at least one input comprises a plurality of inputs, wherein said plurality of inputs comprising a right signal input, a left signal input, a stop light input and a running light input.

6. The trailer light converter as claimed in claim 5 wherein said at least one output comprises a plurality of outputs and wherein said plurality of outputs comprise a right lamp output, a left lamp output and a running lamp output.

7. The trailer light converter as claimed in claim 6 wherein said at least one switch comprises a plurality of switches, wherein one of said plurality of switches is responsive to operation of said right signal input or said stop light input to illuminate the right light of the towed vehicle, and another of said switches responsive to operation of said left signal input or said stop light input to illuminate the left light of the towed vehicle.

8. The trailer light converter as claimed in claim 6 wherein yet another of said switches responsive to operation of said running light input to illuminate the running light of the towed vehicle.

9. A trailer light converter that is configured to operate lights of a towed vehicle from signals supplied from lighting circuits of a towing vehicle, said converter comprising:
at least one input that is connectable with lighting circuits of a towing vehicle and at least one output that is connectable with lights of a towed vehicle;
at least one switch that is responsive to a signal applied to said at least one input to supply electrical power to said at least one output to illuminate at least one light of the towed vehicle;
wherein said at least one switch comprises a switching transistor and an overload protector, said at least one switch being responsive to the signal applied to said at least one input to change to a low-impedance state to supply power to said at least one output and said overload protector is responsive to an overload condition on said at least one output to turn said at least one switch to a high-impedance state to remove power from said at least one output, wherein said switching transistor comprises a field effect transistor and said overload protector is responsive to an increase in voltage across the source to drain junction of said field effect transistor; and a timing section comprising a capacitor, said overload protector charging said capacitor in response to an overload condition, wherein said timing section delaying said overload protector responding to an overload condition thereby avoiding nuisance responses.

10. A trailer light converter that is configured to operate lights of a towed vehicle from signals supplied from lighting circuits of a towing vehicle, said converter comprising:

at least one input that is connectable with lighting circuits of a towing vehicle and at least one output that is connectable with lights of a towed vehicle;

at least one switch that is responsive to a signal applied to said at least one input to supply electrical power to said at least one output to illuminate at least one light of the towed vehicle;

wherein said at least one switch comprises a switching transistor and an overload protector, said at least one switch being responsive to the signal applied to said at least one input to change to a low-impedance state to supply power to said at least one output and said overload protector is responsive to an overload condition on said at least one output to turn said at least one switch to a high-impedance state to remove power from said at least one output, wherein said at least one switch draws power from the lighting circuits of the towing vehicle, thereby not requiring connection with the vehicle's power system.

11. A trailer light converter that is configured to operate lights of a towed vehicle from signals supplied from lighting circuits of a towing vehicle, said converter comprising:

at least one input that is connectable with lighting circuits of a towing vehicle and at least one output that is connectable with lights of a towed vehicle;

at least one switch that is responsive to a signal applied to said at least one input to supply electrical power to said at least one output to illuminate at least one light of the towed vehicle;

wherein said at least one switch comprises a switching transistor that is operable with an overload protector to respond to the signal applied to said at least one input to change to a low-impedance state to supply power to said at least one output said overload protector responsive to an overload condition on said at least one output to turn said at least one switch to a high-impedance state to remove power from said at least one output, wherein said overload protector is electrically connected in parallel with said switching transistor and is responsive to an increase in voltage across said switching transistor to turn said at least one switch to the high-impedance state, wherein said switching transistor is operable with or without said overload protector, wherein said trailer light converter can be supplied with an overload protector or without an overload protector without further modifications to said at least one switch.

12. The trailer light converter as claimed in claim 11 wherein said at least one switch is operable with an over-temperature protector and without an over-temperature protector wherein said over-temperature protector affects operation of said overload protector wherein said overload protector will be more responsive to overload conditions at higher temperatures, wherein said trailer light converter can be supplied with an over-temperature protector or without an overload protector without further modification to said at least one switch.

13. The trailer light converter as claimed in claim 11 wherein said overload protector is responsive to an increase in voltage across said at least one switch to turn said at least one switch to a high impedance state.

14. The trailer light converter as claimed in claim 11 wherein said switching transistor comprises a field effect transistor and said overload protector is responsive to an increase in voltage across the source to drain junction of said field effect transistor.

15. The trailer light converter as claimed in claim 11 including a timing section, said timing section delaying said overload protector responding to an overload condition thereby avoiding nuisance responses.

16. The trailer light converter as claimed in claim 11 wherein said at least one switch draws power from the lighting circuits of the towing vehicle.

17. The trailer light converter as claimed in claim 11 wherein said at least one input comprises a plurality of inputs, wherein said plurality of inputs comprising a right signal input, a left signal input, a stop light input and a running light input.

18. The trailer light converter as claimed in claim 17 wherein said at least one output comprises a plurality of outputs and wherein said plurality of outputs comprise a right lamp output, a left lamp output and a running lamp output.

19. The trailer light converter as claimed in claim 18 wherein said at least one switch comprises a plurality of switches, wherein one of said plurality of switches is responsive to operation of said right signal input or said stop light input to illuminate the right light of the towed vehicle, and another of said switches responsive to operation of said left signal input or said stop light input to illuminate the left light of the towed vehicle.

20. The trailer light converter as claimed in claim 19 wherein yet another of said switches responsive to operation of said running light input to illuminate the running light of the towed vehicle.

* * * * *